United States Patent [19]

Bogert

[11] Patent Number: 4,772,084
[45] Date of Patent: Sep. 20, 1988

[54] OPTICAL POWER SPLITTER AND POLARIZATION SPLITTER

[75] Inventor: Gail A. Bogert, Hanover Township, Northampton County, Pa.

[73] Assignee: American Telephone and Telegraph Company AT&T Bell Laboratories, Murray Hill, N.J.

[21] Appl. No.: 851,790

[22] Filed: Apr. 14, 1986

[51] Int. Cl.$^4$ .......................... G02B 6/26; G02B 6/42
[52] U.S. Cl. ............................ 350/96.15; 350/96.12; 350/96.13; 350/96.14
[58] Field of Search ............... 350/96.15, 96.12, 96.13, 350/96.14

[56] References Cited

U.S. PATENT DOCUMENTS

| | | | |
|---|---|---|---|
| 4,273,444 | 6/1981 | Pool et al. | 356/350 |
| 4,280,766 | 7/1981 | Goss et al. | 356/350 |
| 4,299,490 | 11/1981 | Cahill et al. | 356/350 |
| 4,440,498 | 4/1984 | Sheem | 356/350 |
| 4,445,780 | 5/1984 | Burns | 356/350 |
| 4,479,715 | 10/1984 | Sheem | 356/350 |

OTHER PUBLICATIONS

"An Optical Waveguide TE-TM Mode Splitter", *Appl. Phys. Lett.*, vol. 32, No. 5, Mar. 1978, Kobayashi et al., pp. 300-302.
"Sagnac Fiber-Ring Interferometer . . .", *Appl. Phys. Lett.*, vol. 33, No. 11, Dec. 1978, Thompson et al., pp. 940-941.
"Optical Waveguide 3×3 Switch . . .", *Appl. Opt.*, vol. 18, No. 4, 2/15/79, Ogiwara, pp. 510-515.
"LiNbO$_3$ Coupled-Waveguide . . .", *Appl. Phys. Lett.*, vol. 36, No. 7, Apr. 1980, Mikami, pp. 491-493.
"Optical Guided-Beam Splitter . . .", *Appl. Opt.*, vol. 19, No. 8, 4/15/80, Vicent et al., pp. 1285-1293.
"Fiber-Optic Gyroscope . . .", *Appl. Phys. Lett.*, vol. 37, No. 10, vol. 37, No. 10, 11/15/80, Sheem, pp. 869-871.
"Optical Fiber Interferometers . . .", *J. Appl. Phys.*, vol. 52, No. 6, Jun. 1981, Sheem, pp. 3865-3872.
"Crosstalk Characteristics of Ti-LiNbO$_3$ . . .", *IEEE J. Quan. Elec.*, vol. QE-18, No. 4, Apr. 1982, Nakajima et al., pp. 771-776.
"3×2 Channel Waveguide Gyroscope . . .", *IEEE J. Quan. Elec.*, vol. QE-18, No. 10, Oct. 1982, Burns, pp. 1790-1796.
"Passive Ti:LiNbO$_3$ Channel Waveguide . . .", *Appl. Phys. Lett.*, vol. 44, No. 6, 3/15/84, Yap et al., pp. 583-585.
"Coupling Effects in Symmetrical . . .", *J. Opt. Soc. AmA*, vol. 1, No. 11, Nov. 1984, Ruschin et al., pp. 1120-1128.
International Conference on Integrated Optics and Optical Fiber Communication, Technical Digest, Jul. 18-20, 1977, (Institute of Electronics and Communication Engineers of Japan, Tokyo, JP), M. Minakata et al., "Optical Intensity Modulator Using a Pair of Gate Couplers and Electro-Optic Phase Shifters", pp. 145-148.
Japanese Journal of Applied Physics, vol. 19, Supplement 19-1, 1980, (Publication Office Japanese Journal of Applied Physics, Tokyo, JP), O. Mikami, "A Coupled-Waveguide TE/TM Mode Splitter", see pp. 455-458.
Applied Physics Letters, vol. 37, Jul. 1980, (American Institute of Physics, New York, USA), M. Masuda, "An Optical TE-TM Mode Splitter Using LINbO3 Branching Waveguide", see pp. 20-21.
First International Confr. on Optical Fiber Sensors, 26-28, Apr. 1983, (Institution of Electrical Engineers, London, GB), K. P. Koo et al., "Performance Characteristics of Passively Stabilized Fiber Interferometer Using (3×3) Fiber Directional Couplers", pp. 200-204, FIGS. 1-3; pp. 200, Col. 2, Lines 1-63; pp. 201, Col. 1, Lines 1-19.

*Primary Examiner*—William L. Sikes
*Assistant Examiner*—Robert E. Wise
*Attorney, Agent, or Firm*—Wendy W. Koba

[57] ABSTRACT

A 3×3 optical guiding arrangement is disclosed for providing both power splitting between a pair of output guides in the 3×3 guide structure and polarization splitting (into the TE and TM modes) between the central guide and the pair of outer guides. In accordance with the present invention, the mutual coupling length L and separation distance d between adjacent guides are chosen to provide the desired polarization splitting and total intensity (power) in the outer guides. For example, an input signal of intensity I comprising both the TE and TM modes may be launched in the center guide and with correct choices for L and d, will result in output signals of $I_{TM}/2$ each of the outer pair of guides and $I_{TE}$ from the central guide.

7 Claims, 4 Drawing Sheets

OPTICAL POWER SPLITTER AND POLARIZATION SPLITTER This invention was made with Government support under NASA Contract NAS7-918—Jet Propulsion Laboratories Subcontract 956805, awarded by the National Aeronautics and Space Administration. The Government has certain rights in the invention.

The invention described herein was made in the performance of work under NASA Contract No. BP-6-0419-200 Subcontract 956805 and is subject to the provisions of Section 305 of the National Aeronautics and Space Act of 1958 (72 Stat. 435; 42 U.S.C. 2457).

BACKGROUND OF THE INVENTION

1. Field of the Invention

The present invention relates to an optical power splitter and polarization splitter and, more particularly, to a 3×3 light guiding arrangement wherein light containing both TE and TM polarization may be launched in the middle light guide to form, for example, outputs of TM/2 in each of the two outer guides and TE in the center guide.

2. Description of the Prior Art

There exist may systems which require both optical beam splitters and polarizers. For example, effective beamsplitters are often a useful component in laser sharing systems, for example, optical customer loop networks must share laser sources to meet the needs of numerous customers with a minimal cost. In these instances, 1×N beamsplitters could be utilized to share a single laser among a plurality of N users. Another candidate for optical beamsplitters are rotation measuring fiber optic gyroscopes, which are beginning to replace mechanical gyroscopes for both military and civilian applications. In a fiber gyro, a light beam is launched in counter propagating directions through a coil of fiber, preferably single mode fiber. As the system rotates, to the light beam traveling in the same direction with the rotation will become delayed with respect to the light beam traveling against the direction of rotation. That is, the apparent optical path length seen by the light traveling with the rotation is increased, while the apparent optical path length seen by the light traveling against the rotation is decreased. The increased and decreased apparent optical lengths thus result in a phase difference between the two light beams as they emerge from the fiber loop. This phase difference can then be measured to to provide an indication of the system's rotation.

A typical prior art optical gyroscope is disclosed in U.S. Pat. No. 4,280,766 issued to W. C. Goss et al on July 28, 1981. In the Goss et al system, a 2×2 beamsplitter is used to create the pair of light beams which will propagate in opposite directions through the fiber loop. A problem with the 2×2 beamsplitter arises in systems which require a high degree of sensitivity. It can be shown that in order to provide a linear relationship between rotation and phase difference, an additional phase bias of $\pi/2$ must be introduced into the system. A complete explanation of this aspect of 2×2 beamsplitters can be found in the article entitled "Fiber-optic gyroscope with [3×3] directional coupler" by S. K. Sheem appearing in *Applied Physics Letters*, Vol. 37, No. 10, November 1980 at p. 869–871. Many 2×2 optical gyroscope systems, including Goss et al, utilize external components to provide this phase bias. In his article, Sheem proposes an alternative solution, the use of a 3×3 beamsplitter, which can be demonstrated to incorporate this required phase bias. U.S. Pat. No. 4,440,498 issued to S. K. Sheem on Apr. 3, 1984 discloses an optical gyroscope utilizing the 3×3 directional coupler described in the article. In this system, the incoming light is launched into the center waveguide and the outer pair of waveguides are coupled to the fiber loop forming the gyro. As with the system discussed above, the phase difference between the light outputs from the outer pair of waveguides is indicative of the rotation experienced by the gyroscope. Various alternative configurations of the 3×3 directional coupler are discussed by Sheem in a later article entitled "Optical fiber interferometers with [3×3] direction couplers: Analysis" appearing in the *Journal of Applied Physics*, Vol. 52, No. 6, June 1981 at pp. 3865–3872. One such alternative arrangement is disclosed in U.S. Pat. No. 4,479,715 issued to Sheem on Oct. 30, 1984, wherein a combination of a 3×3 directional coupler with a 2×2 directional coupler are utilized to form a rotation-sensing interferometer. Another implementation, which can be formed as a planar structure, is described in an article entitled "3×2 Channel Waveguide Gyroscope Couplers: Theory" by W. K. Burns et al appearing in the *IEEE Journal of Quantum Electronics*, Vol. QE-18, No. 10, October 1982 at pp. 1790–96. In this type of coupler, the incoming central waveguide is terminated in the body of the structure, thus decreasing the separation between adjacent optical paths to increase the amount of optical coupling. U.S. Pat. No. 4,445,780 issued to W. K. Burns on May 1, 1984 discloses a rotation-sensing gyroscope utilizing this 3×2 coupler.

Since gyroscopes require a unique path for the two counterpropagating beams, polarizing components must also be utilized. An imperfect polarizer in the gyroscope results in a phase bias which is proportional to the extinction ratio of the polarizer. False readings of rotation rate result due to this phase bias. Often, these polarizers are formed by incorporating predetermined bends in the fiber loop forming the rotator. These bends place a stress on the fiber which induces a birefringence in the fiber, thus altering the propagating constants of the two polarized modes and insuring a predetermined degree of coupling between the two modes. However, the amount of bending required to provide the necessary stress-induced birefringence will change as a function of type of fiber utilized, the size of the fiber loop, the number of turns used to form the loop, etc. Additionally, system changes may disturb the fiber loop so as to change the induced birefringence. For example, military system applications may introduce changes into the fiber loop which alter or destroy this induced birefringence. Alternative polarizing arrangements include loading the waveguide with either an evaporated material or an optically contacted (and birefringent) superstrate. These arrangements, although useful, are found in practice to exhibit a poor degree of polarization extinction as a function of length, and offer no design freedom in the choice of polarization which is suppressed.

Therefore, a need remains in the prior art for an integrated component capable of performing both the power splitting and polarization splitting required for fiber gyroscope applications.

SUMMARY OF THE INVENTION

The need remaining in the prior art is addressed by the present invention which relates to an optical 3×3 light guide beamsplitter and polarization splitter and, more particularly, to a 3×3 light guide arrangement wherein light containing both TE and TM polarization components may be launched in the middle guide to form outputs of TM/2 in each of the two outer waveguides and TE in the center waveguide (or alternatively, TE/2 and TM).

It is an aspect of the present invention to provide a 3×3 light guide arrangement capable of being utilized in a fiber optic gyroscope application which is capable of providing both the necessary power splitting and polarization splitting requirements.

In accordance with the present invention, the required TM,TE polarization splitting is accomplished by configuring the separation, d, and coupling length, L, associated with the waveguides.

Another aspect of the present invention is to provide both power splitting and polarization splitting with a single integrated optic structure, where in one embodiment of the present invention the structure comprises a set of three planar waveguides formed in an optical substrate.

Yet another aspect of the present invention is to provide a polarization ratio (unwanted polarization in outer two guides/polarization in middle guide) of greater than −30 dB by utilizing an external electrode array displaced over the optically integrated 3×3 waveguide configuration.

Other and further aspects of the present invention will become apparent during the course of the following discussion and by reference to the accompanying drawing.

BRIEF DESCRIPTION OF THE DRAWINGS

Referring now to the drawings, where like numerals represent like parts in several views.

DETAILED DESCRIPTION

The power and polarization splitting arrangement of the present invention is described below in terms of an integrated optical device, that is, a set of three planar waveguides formed in an optical substrate. It is to be understood, however, that the arrangement of the present invention may also be formed completely of optical fiber, or any other light guiding material.

Figure 1:
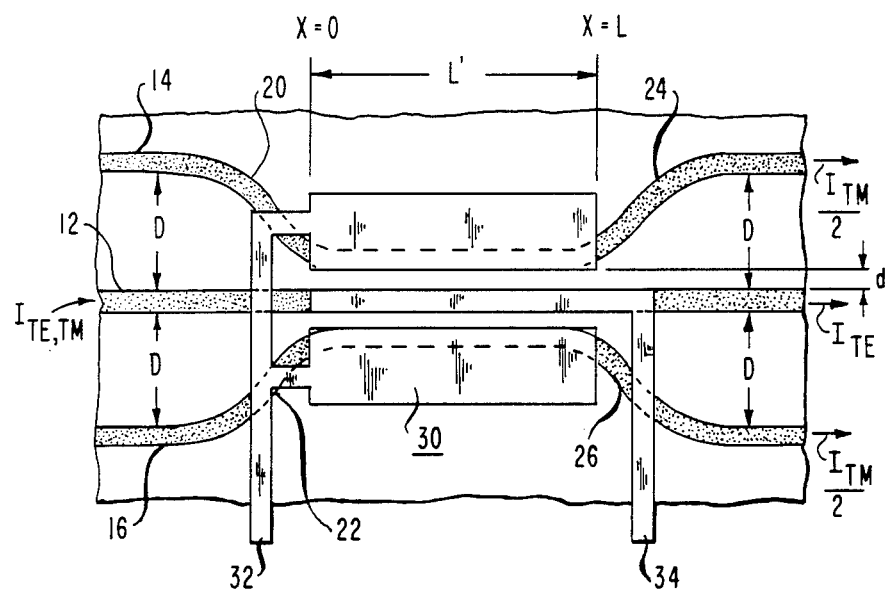
FIG. 1 illustrates a 3×3 waveguide power splitter and polarization splitter formed in accordance with the present invention.

A 3×3 waveguide power splitter and polarizer 10 formed in accordance with the present invention is illustrated in FIG. 1. Device 10 comprises a set of planar channel waveguides 12,14 and 16 which are formed in an optical substrate 15. For example, waveguides 12,14 and 16 may comprise titanium diffused into a lithium niobate ($LiNbO_3$) substrate. However, any optical substrate material, as well as any waveguide material, may be utilized in practicing the present invention. The input to device 10, which may be provided by a coupled single mode optical fiber (not shown), is applied to waveguide 12, the middle waveguide of the arrangement. As shown, this input I comprises both the TE and TM polarized modes. In accordance with the teachings of the present invention, the output from waveguide 12 will consist solely of the TE polarization, where this output is defined as $I_{TE}$. Power splitting is achieved between waveguides 14 and 16 of device 10 so that the output from waveguide 14, as well as waveguide 16, is one-half of the TM polarized portion of the input signal, defined as ($I_{TM}/2$). As shown in the exemplary embodiment of FIG. 1, waveguides 12,14 and 16 are initially separated by a predetermined distance D, where this distance gradually decreases through S-shaped bends 20 and 22 in waveguides 14 and 16, respectively, until that the three waveguides are separated by a substantially smaller distance d. Waveguides 12,14 and 16 continue in this parallel arrangement for a predetermined distance L'. Waveguides 14 and 16 then become progressively separated from waveguide 12 through bends 24 and 26, respectively, until the three waveguides are again separated by the predetermined distance D. This particular geometry is useful in providing sufficient spatial separation between adjacent waveguides to facilitate the mating of optical fibers or other components to the waveguides. Additionally, the increased separation provides sufficient decoupling between adjacent waveguides so that the overall length of device 10 is not restricted to the coupling length L as defined hereinafter. In contrast, if the 3×3 structure of the present invention illustrated in FIG. 5 were to be employed, the length of the device would need to be carefully controlled, the optical substrate being cut and polished to exactly the required coupling length. For these reasons, therefore, the structure of FIG. 1 is considered to be the preferred embodiment of the present invention.

It is to be noted that in order to provide both power splitting and signal polarization in accordance with the present invention, complete symmetry must be retained along the X axis, as illustrated by the dotted line in FIG. 1. As will be explained in detailed hereinafter, an electrode configuration 30, including a first electrode 32 and a second electrode 34, may be formed over waveguides 12,14 and 16 as shown in FIG. 1 to fine tune the outputs from device 10, where first electrode 32 is coupled to a first external power supply (not shown) and second electrode 34 is connected to a second external power supply (not shown).

In order to understand the operation of the arrangement of the present invention, its ability to provide power splitting will first be discussed, with a discussion of the polarization splitting aspect to follow. Power splitting using a 3×3 directional coupler is well known in the art, where the reader is directed to any of the Sheem references cited above for a complete description. The following description is provided only to form a basis of understanding of the operation of the present invention. In the general case of a 3×3 directional coupler, the relation between the power E(z) emerging from each of the three waveguides as a function of the power E(0) introduced at the input to each of the three waveguides may be expressed in the following form (subscript 1 referring to waveguide 14, subscript 2 referring to waveguide 12, and subscript 3 referring to waveguide 16):

$$\begin{bmatrix} E_1(Z) \\ E_2(Z) \\ E_3(Z) \end{bmatrix} =$$

$$\exp(-i\phi) \begin{bmatrix} A + \frac{\exp(-i\theta)}{2} & B & A - \frac{\exp(-i\theta)}{2} \\ B & 2A^* & B \\ A - \frac{\exp(-i\theta)}{2} & B & A + \frac{\exp(-i\theta)}{2} \end{bmatrix} \begin{bmatrix} E_1(0) \\ E_2(0) \\ E_3(0) \end{bmatrix}$$

where

Z is the distance along the guide,
$A = \frac{1}{2}\cos(\alpha Z) - i(\beta_1 - \beta_2)\sin(\alpha Z)/4\alpha$,
$B = ik \sin(\alpha Z)\alpha$,
$\phi = (\beta_1 + \beta_2)Z/2$,
$\theta = (\beta_1 - \beta_2)Z/2$,
$\alpha = [(\beta_1 - \beta_2)^2 + 8K^2]^{\frac{1}{2}}/2$,
K is the coupling coefficient between adjacent guides, and
$\beta_n$ is defined as the constant of light in nth guide.

For the power splitting purposes of the present invention, $\beta_1$, (for waveguide 14) is constrained to be equal to $\beta_3$ (for waveguide 16). To provide power splitting utilizing this 3×3 arrangement, the total input signal is applied to the center waveguide, defined as waveguide 12 in FIG. 1. Therefore, the matrices above can be rewritten as:

$$\begin{bmatrix} E_1(Z) \\ E_2(Z) \\ E_3(Z) \end{bmatrix} =$$

$$\exp(-i\phi) \begin{bmatrix} A + \frac{\exp(-i\theta)}{2} & B & A - \frac{\exp(-i\theta)}{2} \\ B & 2A^* & B \\ A - \frac{\exp(-i\theta)}{2} & B & A + \frac{\exp(-i\theta)}{2} \end{bmatrix} \begin{bmatrix} 0 \\ 1 \\ 0 \end{bmatrix}$$

which reduces to $$\begin{bmatrix} E_1(Z) \\ E_2(Z) \\ E_3(Z) \end{bmatrix} = \exp(i\phi) \begin{bmatrix} B \\ 2A^* \\ B \end{bmatrix}.$$

Thus, it is shown that the energy at the output of waveguide 14 (B) is equal to that from waveguide 16 (B), where both of these are equal to $\exp(-i\phi)ik\sin(\alpha z)/\alpha$.

Figure 2:
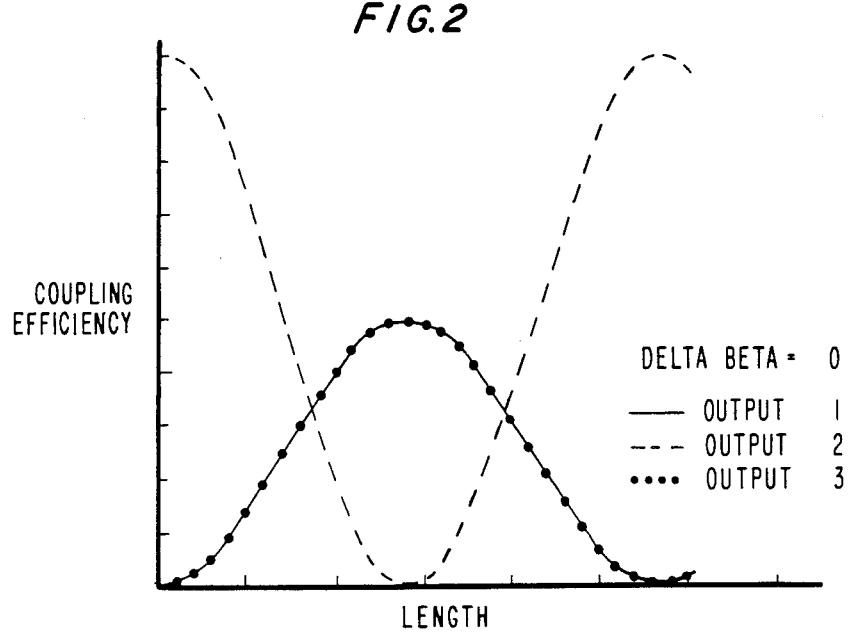
FIGS. 2-4 contain graphs illustrating the coupling efficiency between the outer two waveguides and the middle waveguide of the configuration of FIG. 1, with an input signal launched in the middle waveguide for different delta beta values.
Figure 3:
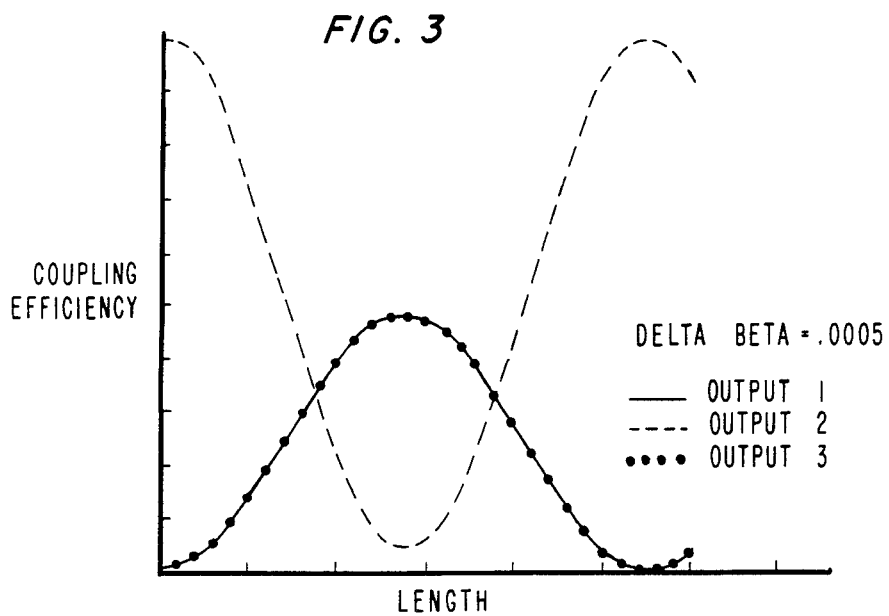
Figure 4:
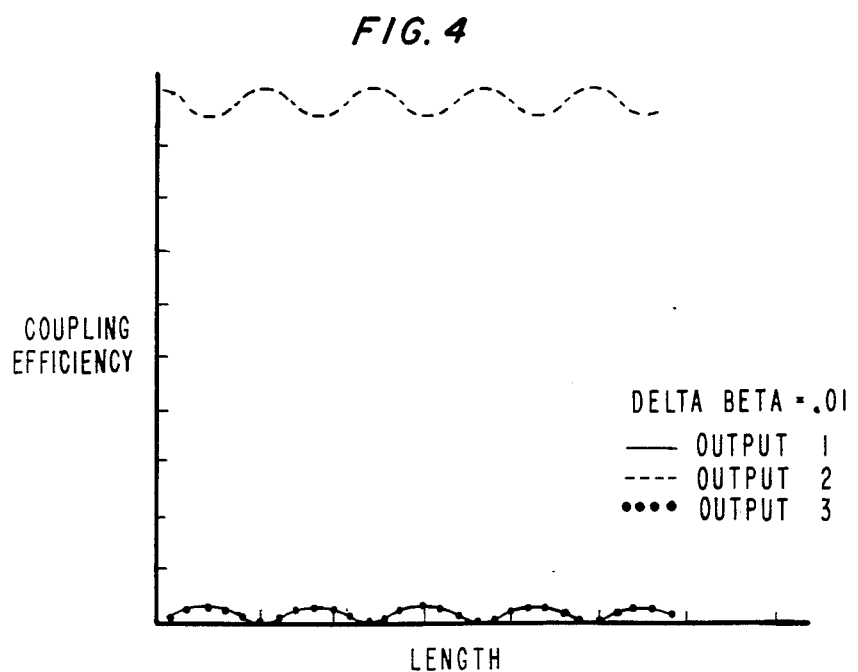

FIGS. 2-4 contain graphs illustrating the various outputs from device 10 as a function of the difference between the propagation constants, $\beta_1$ of outer waveguides 14, 16 and $\beta_2$ of the middle waveguide 12. FIG. 2 illustrates the condition when the propagation constants of all three guides are equal (i.e., $(\beta_1\beta_2) = \Delta\beta = 0$). Note that as long as the propagation constants for the outer waveguides 14 and 16 remain equal, the power intensities from waveguides 14 and 16 remain matched. As shown, for a predetermined device length L, virtually all of the signal intensity present in the middle waveguide 12 has been coupled into the outer waveguides 14 and 16. This length L is defined as the coupling length of the device. Referring to FIG. 3, which has a $\Delta\beta$ of 0.0005, it is seen for the same coupling length L, some energy still remains at the output of middle waveguide 12. However, this amount is considered for most applications to be negligible. A large $\Delta\beta$, that is, a large difference in the propagation constant of middle waveguide 12 as compared with that of waveguides 14, 16 will result in a virtual loss of coupling between the input signal and waveguides 14 and 16. This is demonstrated by the graph of FIG. 4, which was calculated for a $\Delta\beta$ of 0.01. Note that in all three cases, as long as the propagation constant for waveguides 14 and 16 remain equal, the power intensities from waveguides 14 and 16 remain matched. This characteristic is seen to be independent of $\Delta\beta$. This attribute of the 3×3 waveguide arrangement allows device 10 to function as an effective beamsplitter.

The three-waveguide directional coupler is a component that is useful when it is desirable to split the intensity of the light equally. The phase between the two outer waveguides 14, 16 is identical. This feature avoids the phase bias problem discussed above.

As mentioned above, device 10 of the present invention is capable of providing not only power splitting, but polarization splitting, as illustrated in FIG. 1. As shown, the incoming light I contains both the TE (transverse electric) and TM (transverse magnetic) polarization components. The outputs from waveguides 12, 14, and 16, however, are shown to be completely separated in terms of polarization, with the light emerging from center waveguide 12 comprising only TE polarization, and the remaining TM polarization equally split between waveguides 14 and 16 (the equality in splitting a result of the power splitting ability of device 10 as discussed above). In order to provide polarization splitting in accordance with the present invention, it is necessary to calculate both the separation d between the set of waveguides, as well as the total coupling length L of the 3×3 arrangement.

Figure 5:
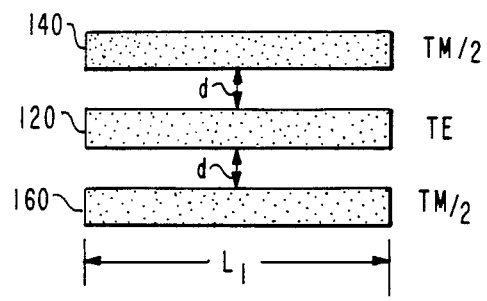
FIG. 5 illustrates an alternative 3×3 power and polarization splitter utilizing a set of three colinear waveguides.

As a first step in the calculation process, assume that the three waveguides are completely colinear, forming the arrangement illustrated in FIG. 5. As stated above, this arrangement may be utilized in practicing the present invention, although it is not considered a preferable alternative. Here, a set of three waveguides 120, 140 and 160 are each separated by a predetermined distance d and comprise a predetermined length $L_l$. For the present purposes, it is desired to transfer all of the TM polarization from the input of center guide 120 to outer guides 140 and 160. It is well-known in the art that to achieve this complete transfer, a pair of waveguides with a physical length $L_l$ equal to the coupling length $l_{TM}$ of the input signal must be used. Thus for the case of complete polarization transfer between a pair of guides, $L_l/l_{TM} = 1$. For the present three-waveguide embodiment, however, this polarization is split in power between the pair of outer waveguides 140 and 160. Thus, the relation defined above is rewritten to define a length $l'_{TM}$ for a three waveguide system, where it can be shown that $l'_{TM} = l_{TM}\sqrt{2}$. Accordingly, to provide complete transfer of the TM polarization between center guide 120 and outer guides 140 and 160, the desired relation becomes $$\frac{L_1}{l'_{TM}} = 1, \text{ or } \frac{\sqrt{2} L_1}{l_{TM}} = 1.$$

In order to preserve the TE polarization in center waveguide 120, a physical length $L_l$ equal to twice the coupling length $l_{TE}$ of the input signal is required. Using the same three waveguide analysis as discussed above, this results in the following relation:

$$\frac{L_1}{l'_{TE}} = 2, \text{ or } \frac{\sqrt{2} L_1}{l_{TE}} = 2.$$

These two relations will be important to the analysis of the present invention. In general, the coupling length l may be expressed as $$l = l_o \exp(d/\gamma) \quad (1),$$

where $\gamma$ is defined as the waveguide lateral evanescent penetration depth and $l_o$ is the coupling length evaluated for a set of initial parameters. Both of these quantities are functions of the materials and processes used in forming device 10. Additionally, both $\gamma$ and $l_o$ will have different values for the TE and TM polarization modes. Given the constraints for the TM and TE coupling lengths discussed above, equation (1) can be solved simultaneously for both TM and TE modes to yield the required gap distance d needed to perform this polarization separation. Rewriting equation (1) for the TM mode transfer:

$$\frac{L}{l_{TM}} = \frac{1}{\sqrt{2}} = \frac{L}{l_{oTM}} \exp(-d/\gamma_{TM}) \quad (1TM)$$

and rewriting equation (1) for the TE mode maintenance:

$$\frac{L}{l_{TE}} = \frac{2}{\sqrt{2}} = \frac{L}{l_{oTE}} \exp(-d/\gamma_{TE}) \quad (1TE)$$

Reducing equations (1TM) and (1TE), the following relation may be obtained:

$$\frac{1}{2} = \frac{l_{oTE}}{l_{oTM}} \exp\left(\frac{-d}{\alpha_{TM}} + \frac{d}{\alpha_{TE}}\right). \quad (2)$$

For an exemplary TM case, let $l_{oTM} = 275$ μm and $\gamma_{TM} = 1.9$ μm. For an exemplary TE case, let $l_{oTE} = 585$ μm and $\gamma_{TE} = 3.5$ μm. Solving equation (2) using these values thus yields a gap distance d of approximately 6 μm. This value d = 6 μm may then be used with equation (1) to solve for $L_l$.

It is to be noted, however, that these values are valid only for the colinear three waveguide configuration illustrated in FIG. 5. For the waveguide configuration of the preferred embodiment of FIG. 1, additional analysis related to bends 20, 22, 24 and 26 in the structure must be performed.

Figure 6:
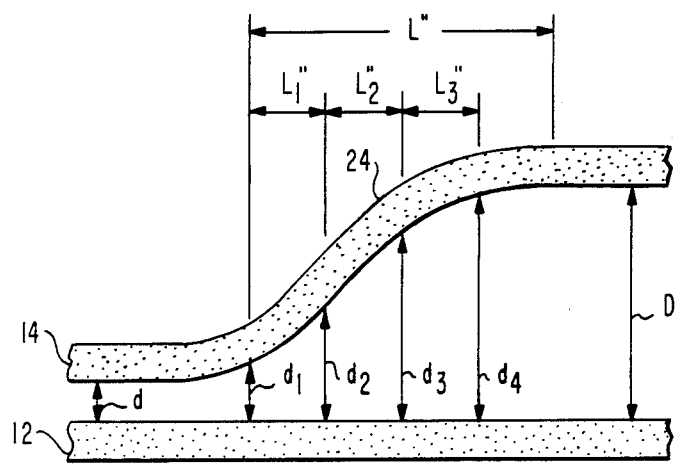
FIG. 6 illustrates a portion of a two waveguide coupler which may be used to describe a portion of the analysis of the arrangement of FIG. 1.

FIG. 6 illustrates a portion of the structure of device 10, in particular, waveguides 12 and 14, with bend 24 in waveguide 14. As stated above, bend 24 is a gentle S-shaped curve which functions to increase the separation between waveguides 12 and 14 from the predetermined value d to a maximum value of D, where it is assumed that there is no coupling between waveguides 12 and 14 when separated by the distance D. The coupling length L" of curved section 24 can be calculated using the following equation, $$\frac{L''}{l} = \frac{1}{l_o} \sum_{n=d}^{D} L''_n \exp(-d_n/\gamma), \quad (3)$$

which represents a step-wise linear approximation of the shape of curve 24. As shown in FIG. 6, $d_n$ represents the incremental separation between waveguides 12 and 14, and $L''_n$ represents the short length used to calculate the actual coupling length. In performing this type of step-wise approximation, it is understood that as the step size decreases, the fit of the approximation to the actual shape of bend 24 is increased. As with the relations defined above, equation (3) must be separately solved for both the TE and TM modes. That is, to find $L''_{TM}$, equation (3) is rewritten as $$l_{TM} = l_{oTM} \exp(6/\gamma_{TM}) \quad (3TM),$$

and to find $L''_{TE}$, equation (3) is rewritten as $$l_{TE} = l_{oTE} \exp(6/\gamma_{TE}) \quad (3TE).$$

Since the complete structure of device 10 contains three waveguides, each solution to equation (3) must be multiplied by the factor $\sqrt{2}$. Additionally, since waveguides 14 and 16 each contain two bends, the coupling lengths must be multiplied by two to arrive at the final solution, $\sqrt{2} 2L''$. For one exemplary set of values, $L''_{TM}/l'_{TM} = 0.353$ μm and $L''_{TE}/l'_{TE} = 0.839$ μm.

The results from equation (3) are then utilized to determined the coupling length L' of the central portion of device 10 as illustrated in FIG. 1. As discussed above for the colinear arrangement of FIG. 5, in order to obtain complete transfer of the TM polarization from the center guide to the outer pair of guides, the physical length L of the device must be equal to one (or, alternatively, an odd number of) coupling length(s) $l'_{TM}$ ($L/l'_{TM} = 1$). To preserve the TE polarization in center guide 12, the physical length L of device 10 must be equal to two (or an even number of) coupling lengths $l'_{TE}$ ($L/l'_{TE} = 2$). These two constraints on the physical length L of device 10 may thus be used in conjunction with the solutions to equation (3) to determined the required length L' of the central portion of device 10, as illustrated in FIG. 1. In particular, $$\frac{L}{l'_{TM}} = 1 = 0.353 + \frac{L'}{l'_{TM}}, \text{ or} \quad (4)$$

$$\frac{L'}{l'_{TM}} = 0.647; \text{ and}$$

$$\frac{L}{l'_{TE}} = 2 = 0.839 + \frac{L'}{l'_{TE}}, \text{ or}$$

$$\frac{L'}{l'_{TE}} = 1.16.$$

Thus, to find the value of L', equation (1) must be solved to find the values of $l'_{TM}$ and $l'_{TE}$. Referring to equation (1), $$l_{TM} = l_{oTM} \exp(d/\gamma_{TM}), \quad (1TM)$$

where, for example, $l_{oTM}=275$ μm, $\gamma_{TM}=1.9$ μm, and $d=6$ μm. It is to be remembered that these values are exemplary only and are used for the sake of discussion. Solving equation (1TM) with these values yields $l_{TM}=6468.28$ μm. Therefore, since $l'_{TM}=l_{TM}/\sqrt{2}$, $l'_{TM}=4573.7$ μm. For the TE polarization, equation (1) is rewritten as:

$$l_{TE}=l_{oTE}\exp(d/\gamma_{TE}). \quad (1TE)$$

where, for example, $l_{oTE}=585$ μm, $\gamma_{TE}=3.5$ μm and $d=6$ μm. Substituting these values into equation (1TE) yields $l_{TE}=3248.33$ μm. Therefore, $l'_{TE}=2296.92$ μm (since $l'TE=2l_{TE}/\sqrt{2}$).

Incorporating these results into to equation (4), the TM polarization yields a final length L of approximately 2959 μm, and the TE polarization yields a final length L of approximately 2664 μm. The differences between these two values may be attributed to the initial approximation for d being based on a ratio of TE to TM coupling at one particular gap, where in reality a number of different gaps exist due to the presence of the bends. Agreement between these two values may be accomplished by adjusting both the gap distance d and length L'.

As mentioned above, an external field may also be applied to plates 32 and 34 to tune the amount of decoupling between the TM and TE modes. The particular electrode structure illustrated in FIG. 1 is utilized to insure that both outer waveguides 14 and 16 see the same electric field with respect to center waveguide 12. This is required to insure the even power split between electrodes 14 and 16. A relatively small voltage may be applied to achieve a polarization ratio of $-30$ dB, where the polarization ratio is defined as the amount of unwanted TE polarization present in waveguides 14 and 16 divided by the total TE polarization present in all three waveguides. It should be noted, however, that with less stringent requirements for the polarization ratio, the application of an external electric field will usually not be necessary.

What is claimed is:

1. An optical guiding structure for providing splitting of both the power I of an input signal and the polarizations TE, TM (TE being defined as the transverse electric polarization and TM being defined as the transverse magnetic polarization) of said input signal, said optical guiding structure being defined as having
    a central guide and a pair of outer guides, coextensively parallel over a predetermined length L and mutually separated by a predetermined distance d, wherein the propagation constants $\beta_1$ and $\beta_3$ of said outer pair of guides are equal to a first propagation value $\beta_1=\beta_3=\beta$;
    the predetermined length L and predetermined separation distance d defined by the relations $$\frac{L}{l_{TM}} = \frac{L}{\sqrt{2}} l_{oTM}\exp(-d/\gamma_{TM}), \text{ and}$$

$$\frac{L}{l_{TE}} = \frac{2L}{\sqrt{2}} l_{oTE}\exp(-d/\gamma_{TE}),$$

being defined as the coupling length required to completely transfer a first polarized state from one guide to an adjoining guide for a predefined pair of guides, and $\gamma$ being defined as the guide lateral evanscent penetration depth, the relations being solved for proscribed values of $l_{oTM}$, $l_{oTE}$, and $\gamma_{TE}$, said predetermined length L and predetermined separation distance d thus achieving transfer of a first polarization from an input signal applied to the central guide to said outer pair of guides and allowing the second, remaining polarization to emerge from said central guide.

2. An optical guiding structure as defined in claim 1 wherein the input signal may be applied to the central guide and the predetermined length L and separations distance d are chosen so that the TM polarization is coupled into the outer pair of guides and the TE polarization emerges from the central guide, the set of output signals being defined as $I_{TM}/2$ for said outer pair of guides and $I_{TE}$ for the central guide.

3. An optical guiding structure as defined in claim 1 wherein the input signal may be applied to the central guide and the predetermined length L and separation distance d are chosen so that the TE polarization is coupled into the outer pair of guides and the TM polarization emerges from the central guide, the set of output signals being defined as $I_{TE}/2$ for said outer pair of waveguides and $I_{TM}$ for the central guide.

4. An optical guiding structure as defined in claim 1 wherein the central guide and the pair of outer guides comprise optical waveguides formed in an optical substrate.

5. An optical guiding structure as defined in claim 4 wherein the optical substrate comprises lithium niobate and the guides comprises titanium diffused into the lithium niobate optical substrate.

6. An optical guiding structure as defined in claim 4 wherein the structure further comprises electrode means disposed over each waveguide and coupled to a pair of external power sources, a first electrode of said electrode means associated with the pair of outer waveguides and a second electrode of said electrode means associated with the central waveguide, said electrode means when connected to said pair of external sources capable of providing increased polarization splitting between the central waveguide and the pair of outer waveguides.

7. An optical guiding structure as defined in claim 1 wherein the central guide and the pair of outer guide comprise single mode optical fiber.

* * * * *